United States Patent
Helmore et al.

(10) Patent No.: US 11,649,715 B2
(45) Date of Patent: May 16, 2023

(54) ESTIMATING INSPECTION TOOL VELOCITY AND DEPTH

(71) Applicant: E.V. OFFSHORE LIMITED, Norwich (GB)

(72) Inventors: Steven Helmore, Aberdeenshire (GB); Christopher Scott, Norwich (GB); Jonathan Thursby, Norwich (GB); Philip Brown, Norwich (GB); Fraser Louden, Aberdeen (GB); Tobben Tymons, Aberdeen (GB)

(73) Assignee: E.V. OFFSHORE LIMITED, Norwich (GB)

( * ) Notice: Subject to any disclaimer, the term of this patent is extended or adjusted under 35 U.S.C. 154(b) by 65 days.

(21) Appl. No.: 16/971,931

(22) PCT Filed: Feb. 4, 2019

(86) PCT No.: PCT/GB2019/050289
§ 371 (c)(1),
(2) Date: Aug. 21, 2020

(87) PCT Pub. No.: WO2019/162642
PCT Pub. Date: Aug. 29, 2019

(65) Prior Publication Data
US 2021/0088546 A1    Mar. 25, 2021

(30) Foreign Application Priority Data

Feb. 21, 2018    (GB) .................................... 1802808

(51) Int. Cl.
*E21B 47/00*    (2012.01)
*E21B 47/002*    (2012.01)
(Continued)

(52) U.S. Cl.
CPC ............ *E21B 47/002* (2020.05); *E21B 47/04* (2013.01); *G01P 3/68* (2013.01)

(58) Field of Classification Search
CPC ........... E21B 47/002; E21B 47/04; G01P 3/68
See application file for complete search history.

(56) References Cited

U.S. PATENT DOCUMENTS 4,855,820 A * 8/1989 Barbour ................. H04N 7/185
348/81
5,652,617 A * 7/1997 Barbour ................. E21B 47/002
348/85
(Continued)

FOREIGN PATENT DOCUMENTS

WO    2013056016 A1    4/2013
WO    2013191839 A1    12/2013

OTHER PUBLICATIONS

Tymons et al. "From Qualitative to Quantitative—How Visual Data Analytics has Transformed Downhole Video Diagnostic Services" SPE-195797-MS (Year: 2019).*
(Continued)

*Primary Examiner* — John Fitzgerald
(74) *Attorney, Agent, or Firm* — Hayes Soloway PC

(57) ABSTRACT

A method for determining a corrected axial displacement parameter of a conduit inspection tool, in particular a downhole inspection tool, during transit of the tool axially along a conduit is disclosed. The tool used in the method has an imaging device and may be attached to a control module with a connecting line. The method comprises obtaining successive axially overlapping images of an internal wall of the conduit, determining, from the images, an observed axial displacement parameter of the tool as a function of transit time, identifying, in the images, a plurality of reference points, determining an estimated axial displacement parameter of the tool over an of transit time between successive
(Continued)

reference points, and computing the corrected axial displacement parameter of the tool by applying a correction factor to the observed axial velocity of the tool.

24 Claims, 11 Drawing Sheets

(51) Int. Cl.
*E21B 47/04* (2012.01)
*G01P 3/68* (2006.01)

(56) References Cited

U.S. PATENT DOCUMENTS

| | | | |
|---|---|---|---|
| 9,765,609 B2* | 9/2017 | Chemali | E21B 47/002 |
| 10,605,077 B2* | 3/2020 | Aird | E21B 49/005 |
| 2003/0118230 A1 | 6/2003 | Song et al. | |
| 2011/0172923 A1 | 7/2011 | Van Os et al. | |
| 2012/0169841 A1* | 7/2012 | Chemali | E21B 47/002 |
| | | | 348/E7.001 |
| 2015/0077537 A1* | 3/2015 | Thursby | H04N 5/2252 |
| | | | 348/85 |
| 2020/0055196 A1* | 2/2020 | Halpenny | E21B 23/00 |
| 2020/0302625 A1* | 9/2020 | Helmore | G01B 11/24 |
| 2020/0394839 A1* | 12/2020 | Helmore | G01N 21/954 |
| 2021/0087920 A1* | 3/2021 | Scott | G06T 7/248 |
| 2021/0115781 A1* | 4/2021 | Stark | G01B 11/12 |

OTHER PUBLICATIONS

Optis Infinity M125 (Year: 2019).*

* cited by examiner

ESTIMATING INSPECTION TOOL VELOCITY AND DEPTH

CROSS-REFERENCE TO RELATED APPLICATIONS AND PRIORITY

This patent application claims priority from PCT Patent Application No. PCT/GB2019/050289 filed Feb. 4, 2019, which claims priority from Great Britain Patent Application No. GB 1802808.4 filed Feb. 21, 2018. Each of these patent applications are herein incorporated by reference in its/their entirety.

FIELD OF THE INVENTION

This invention relates to methods and systems for accurately estimating the speed and depth of an inspection tool within a pipe or conduit using an imaging device on the inspection tool. In particular, this technology applies to the real-time or post-processing of downhole images from surface or subsurface pipes in the oil and gas industry.

BACKGROUND TO THE INVENTION

It is common practice in the oil and gas industry to make measurements of formation properties ('Open Hole') or pipe components ('Cased Hole') by lowering instruments down the well on cables or coiled tubing. The depth location of the objects being investigated is commonly estimated by determining the length of cable or tubing spooled into the hole.

Due to stretch of the cable or coiled tubing and variations in friction throughout the whole system, this depth estimate is often inaccurate.

It is also possible to estimate the depth of a tool by using data obtained from sensors such as accelerometers or head tension devices, which can provide information on the behaviour of the tool itself rather than the cable or coiled tubing. While the data from such sensors can be used to estimate the change in position of a tool over a relatively short distance, the accuracy of this approach tends to decrease with increasing distance.

Against that background, it would be desirable to provide methods and systems for estimating the velocity and depth of a downhole tool that offer increased accuracy compared to known methods and systems.

SUMMARY OF THE INVENTION

The methods and systems of the present invention provide a means to correct surface measurements of depth and tool speed which are prone to errors, for example from stretch of the cable or coiled tubing supporting the inspection tool or due to friction between the tool and the conduit causing stick/slip behaviour. The measurements obtained by the methods and systems of the present invention can provide precise depth locations of downhole components and pipe or conduit anomalies which may be used during production optimisation and for planning well interventions.

From a first aspect, the present invention provides a method for determining a corrected axial displacement parameter of a conduit inspection tool having an imaging device. The method comprises:

obtaining, using the imaging device, successive axially overlapping images of an internal wall of a conduit during transit of the tool axially along the conduit;
determining, from the images, an observed axial displacement parameter of the tool as a function of transit time;
identifying, in the images, a plurality of reference features of fixed position in the conduit and corresponding reference points comprising transit times at which said reference features appear;
determining an estimated axial displacement distance of the tool over an interval of transit time between successive reference points; and
computing the corrected axial displacement parameter of the tool by applying a correction factor to the observed axial displacement parameter of the tool;
wherein the correction factor is determined such that, within the interval of transit time between successive reference points, a total axial displacement distance of the tool determined from the corrected axial displacement parameter is equal to the estimated axial displacement distance.

With this method, a corrected axial displacement parameter such as a displacement distance or velocity of the tool is obtained that has improved accuracy compared to prior art methods. In particular, by combining data derived from the images obtained by the tool and a displacement estimate derived from a different source, the corrected displacement parameter of the tool captures high-frequency changes in velocity due to friction between the tool and the conduit whilst remaining consistent with the displacement measured between the reference points.

The tool may be attached to a control module with a connecting line. In this case, determining the estimated axial displacement distance of the tool may comprise making a displacement measurement of the connecting line at the control module. The estimated axial displacement distance of the tool may be taken as the displacement distance of the connecting line or, alternatively, determining the estimated axial displacement distance of the tool may comprise determining, from the displacement measurement of the connecting line, an estimated axial velocity of the tool as a function of transit time and integrating the estimated axial velocity with respect to time over the interval of transit time.

In cases where the spacing between the reference features is known, the estimated axial displacement distance of the tool can be taken to equal a known spacing distance between the corresponding reference features.

In one embodiment, the displacement parameter is a velocity, and the total axial displacement distance of the tool within the interval of transit time is determined by integrating the corrected axial velocity with respect to time over the interval of transit time.

The observed axial velocity of the tool may be determined in units of image pixels per unit time. The method may comprise converting the observed axial velocity to units of distance per unit time before computing the corrected axial velocity of the tool. In an alternative approach, when the observed axial velocity of the tool is determined in units of image pixels per unit time, a conversion from pixels per unit time to distance per unit time can be incorporated into the correction factor. The correction factor may therefore have units of distance per unit pixel. With this approach, it is not necessary determine a conversion factor to convert the observed axial velocity to units of distance per unit time before computing the corrected axial velocity of the tool.

When the displacement parameter is velocity, the method may further comprise integrating the corrected axial velocity with respect to time to determine a corrected displacement distance of the tool as a function of time.

In another embodiment, the displacement parameter is a displacement distance. In this case, the total axial displacement distance of the tool within the interval of transit time can be determined as the difference in corrected axial displacement distance over the interval.

The observed axial displacement distance of the tool may be determined in units of image pixels. The method may comprise converting the observed axial displacement distance to units of distance by applying a conversion factor to the observed axial displacement distance before computing the corrected axial displacement distance of the tool. Alternatively, a conversion from pixels to distance units can be incorporated into the correction factor.

When a conversion factor for converting pixels to distance units is required, in some embodiments, the method may comprise disposing a reference marker of known dimension on or against the internal wall of the conduit within a field of view of the camera such that the reference marker is visible in one or more of the obtained images, identifying the reference marker in an image corresponding to a transit time, determining the number of image pixels occupied by the known dimension of the reference marker, and determining the conversion factor for that transit time based on the determined number of image pixels and the known dimension of the reference marker. The marker may be a physical member or a visual marker projected from the tool. The reference marker may be a blade or other structure of known width, where the width dimension of the reference marker extends circumferentially with respect to the conduit. Preferably, the tool comprises the reference marker.

The tool may comprise a further sensor offset axially with respect to the imaging device. The method may then comprise determining a corrected displacement position of the further sensor by applying an axial offset to the corrected displacement distance of the tool.

The correction factor may be constant within each interval of transit time between successive reference points. Alternatively, the correction factor may vary according to the internal diameter of the conduit within each interval of transit time. For example, the method may comprise measuring the internal diameter of the conduit as a function of transit time, and the correction factor may vary within each interval of transit time as a function of the measured internal diameter. The internal diameter of the conduit is preferably measured during transit of the tool, for example with a suitable measuring device carried on the tool.

The imaging device preferably comprises a sideview camera arranged such that a centreline of the field of view of the camera is substantially perpendicular to a longitudinal axis of the inspection tool. The imaging device may comprise a plurality of such sideview cameras, arranged such that a centreline of the field of view of each of the cameras lies in a common plane. In another embodiment, the imaging device comprises a downview camera arranged such that a centreline of the field of view of the camera is substantially parallel to a longitudinal axis of the inspection tool.

The corrected axial displacement parameter determined by the method of the invention may be useful in interpreting the image data obtained by the imaging device and/or data from other sensors. In particular, the corrected axial velocity or corrected axial displacement distance can be used to obtain accurate values for the depth or position of images or other data points obtained during inspection.

A second aspect of the invention resides in a conduit inspection system comprising:
  a conduit inspection tool having an imaging device and arranged to transit axially along a conduit; and
  a computer system arranged to:

obtain, from the imaging device, successive axially overlapping images of an internal wall of the conduit;
  determine, from the images, an observed axial displacement parameter of the tool as a function of transit time;
  identify, in the images, a plurality of reference features of fixed position in the conduit and corresponding reference points comprising transit times at which said reference features appear;
  determine an estimated axial displacement distance of the tool over an interval of transit time between successive reference points; and
  compute the corrected axial displacement parameter of the tool by applying a correction factor to the observed axial displacement parameter;
  wherein the correction factor is determined such that, within the interval of transit time between successive reference points, a total axial displacement distance of the tool, determined from the corrected axial displacement parameter, is equal to the estimated axial displacement distance.

The conduit inspection system may comprise a control module and a connecting line attached to the imaging device, the control module being arranged to control movement of the connecting line to transit the tool axially along a conduit. In this case, the computer system may be arranged to determine the estimated axial displacement parameter of the tool by making a displacement measurement of the connecting line at the control module.

The imaging device may comprise one or more sideview cameras. Alternatively, or in addition, the imaging device may comprise a downview camera.

The inspection tool may comprise a reference marker of known dimension arranged to contact or lie on the internal wall of the conduit within a field of view of the camera, such that the reference marker is visible in one or more of the obtained images. The computer system may be arranged to:
  identify the reference marker in an image corresponding to a transit time;
  determine the number of image pixels occupied by the known dimension of the reference marker;
  determine a conversion factor for that transit time based on the determined number of image pixels and the known dimension of the reference marker; and
  apply the conversion factor to the observed axial displacement parameter.

The computer system may be disposed in whole or in part in the inspection tool, in the control module, and/or in one or more further modules of the system. The computer system may be configured to perform the method of the first aspect of the invention.

Preferred and/or optional steps and features of each aspect of the invention may also be used, alone or in appropriate combination, in the other aspects also.

BRIEF DESCRIPTION OF THE DRAWINGS

Embodiments of the present invention will now be described with reference to the accompanying drawings, in which like reference signs are used for like features, and in which.

DESCRIPTION OF THE PREFERRED EMBODIMENTS

Figures 1A, 1B, 1C:
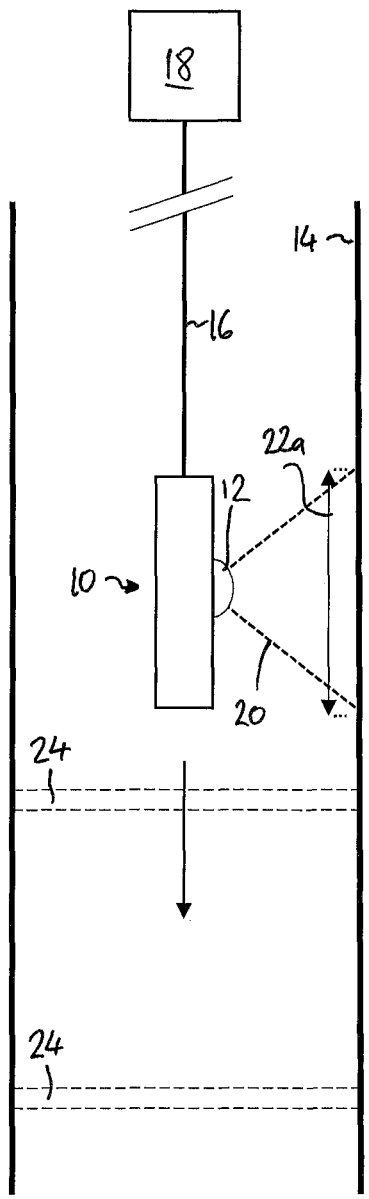
FIGS. 1a, 1b and 1c illustrate a downhole inspection tool having a sideview camera capturing successive overlapping images of the internal surface of a pipe as the inspection tool is moved along the pipe.

FIG. 1a shows, schematically and in cross-section, an inspection tool 10 having an imaging device in the form of a sideways-facing visible light camera 12. The camera 12 captures images through a lens disposed in a side wall of the inspection tool 10. The inspection tool 10 may comprise a plurality of side view cameras 12 such that there are a plurality of corresponding camera lenses spaced equidistantly around the circumference of the inspection tool 10. In these embodiments a centreline of the field of view of the camera 12, or of each of the cameras 12, is substantially perpendicular to a longitudinal axis of the inspection tool 10. These cameras are generally referred to as sideview cameras in the art of wellbore inspection tools.

The tool 10 is shown in operation in a pipe or conduit 14 of a well or other downhole structure. In this example, the pipe 14 is vertically-oriented, but it will be appreciated that the pipe 14 could have any orientation and that the local orientation of the pipe may change over its length. The tool 10 is suspended on a connecting line or downhole line which in this case comprises a cable 16. The cable 16 is attached to a surface control module 18, which is shown schematically in FIG. 1a only.

The control module 18 includes a winch for pulling in and paying out the cable 16, allowing the tool 10 to be moved axially along the pipe 14. By "axially", it is meant that the tool 10 transits in a direction generally parallel to the longitudinal axis of the pipe. As is generally known in the art, operation of the winch is monitored and logged by the control module 18 so that the depth of the tool 10 as a function of time can be estimated from a displacement measurement of the cable 16. For example, the length of cable 16 payed out or pulled in may be measured directly or determined from the operating speed and direction of the winch, with the estimated depth of the tool 10 being equal to the length of cable 16 deployed at a given time. The velocity of the tool 10 can be estimated by differentiating the estimated depth as a function of time.

The camera 12 of the tool 10 is arranged to capture successive images of the internal surface of the pipe 14 that lie within a field of view 20 of the camera 12. Conveniently, the successive images can be captured in the form of a video stream, in which successive images or frames are captured at intervals determined by the frame rate of the video stream.

In FIG. 1a, the axial extent of a first image 22a is indicated. It will be appreciated that the circumferential extent of the image is not indicated in the cross-sectional view of FIG. 1a. FIGS. 1b and 1c show the position of the tool 10 with respect to the pipe 14 at subsequent points in time as the tool 10 moves along the pipe 14.

As illustrated in FIG. 1b, as the tool 10 moves along the pipe 14, the field of view 20 of the camera 12 shifts axially. The camera 12 then captures a second image 22b, corresponding to the subsequent frame in the video stream. The second image 22b overlaps axially with the first image. FIG. 1c shows the position of the tool 10 when a third image 22c is captured, corresponding to a further subsequent frame in the video stream. The third image 22c overlaps axially with the second image 22b. Further axially-overlapping images are captured as the tool 10 continues to move along the pipe 14. The elapsed time or transit time at which each image is obtained is recorded.

The pipe 14 includes a plurality of features, indicated generally at 24, that are spaced apart from one another. The features 24 may be at a known depth position within the pipe 14 or may be at known distances from one another, although it is not necessary that the absolute positions of the features 24 with respect to the surface are known. Examples of reference features 24 may include collars, joins and junctions, and downhole equipment of various types. These reference features 24 provide reference points during subsequent analysis of the images, as will be described in more detail below. The reference features 24 are visible in the images when they are within the field of view 20 of the camera 12. Accordingly, in the illustrated example, one such reference feature 24 would be visible in the third image 22c.

The image data obtained in this way may be logged in the tool 10 and retrieved after removal from the tool 10 from the pipe 14. Alternatively, or in addition, the image data may be transmitted to the control module 18 via the cable 16 for logging at the surface.

The present invention provides a method of using image data, such as can be obtained by the tool 10 as described above, to obtain a measure of the instantaneous axial velocity of the tool 10 during its transit along the pipe 14 that can provide a more accurate indication of the depth of the tool at a given transit time than can be obtained by monitoring the operation of the winch alone.

Figure 2:
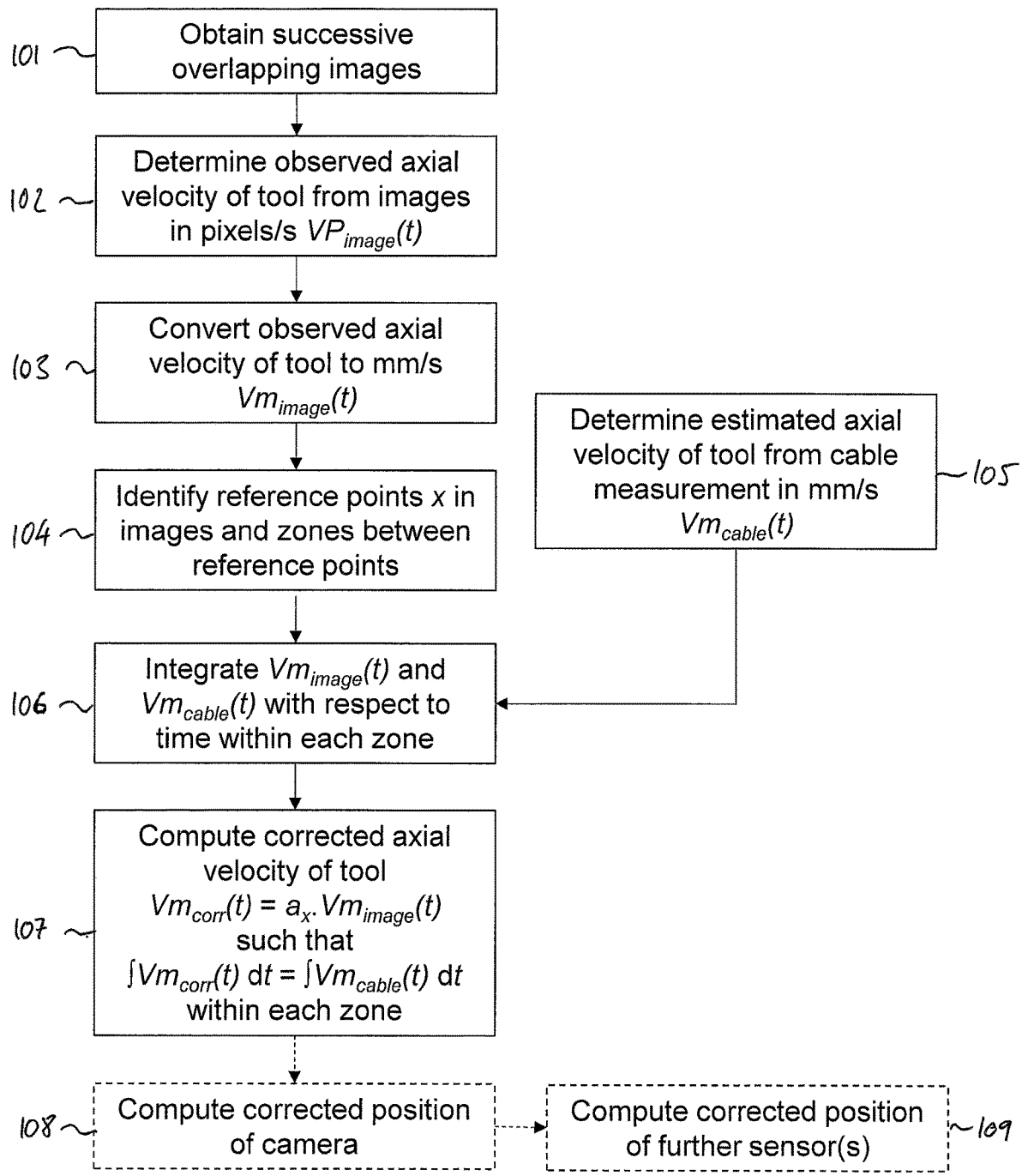
FIG. 2 is a flowchart showing steps in a method of determining a corrected axial velocity of the inspection tool of FIG. 1.

Referring to FIG. 2, in a first step 101 of the method, a plurality of successive axially-overlapping images are obtained as described above. The transit time at which each image was obtained is also recorded, with the transit time being set to zero when the first image is recorded.

In a second step 102, the overlapping images are analysed to determine, as a function of transit time t, an observed axial velocity of the tool $VP_{image}(t)$, in units of image pixels per unit time (expressed as pixels per second in this example). In a third step 103, a conversion is applied to the observed axial velocity in pixels per second to obtain an observed axial velocity $Vm_{image}(t)$ in units of distance per unit time (expressed as millimetres per second in this example).

In a fourth step 104, reference points x are identified in the images. As described above, the reference points are provided by features 24 of the pipe 14 that are spaced apart from one another in distance, and therefore appear at succeeding transit times in the image data as the tool 10 moves along the pipe 14. The transit times at which the reference points appear in the images (or, more accurately, intersect with a central part of the image) define the boundaries of reference transit time intervals, referred to as zones, in the image data.

In a fifth step 105, an estimated axial velocity of the tool $Vm_{cable}(t)$ in units of distance per unit time (expressed as millimetres per second in this example), is determined as a function of transit time from the behaviour of the cable 14 at the control module 18. For example, $Vm_{cable}(t)$ may be determined by measurement of the displacement of the as a function of transit time, or by direct or indirect measurement of the velocity of the cable.

In a sixth step 106, the estimated axial velocity determined from the control module in the fifth step 105, $Vm_{cable}(t)$, and the observed axial velocity determined from the image data in the third step 103, $Vm_{image}(t)$, are both integrated with respect to time within each of the zones identified in the fourth step 104. This integration step provides two estimates of the distance traversed by the tool 10 between the reference points x, calculated from the behaviour of the cable 16 in the first case and the captured image data in the second case.

Figure 3:
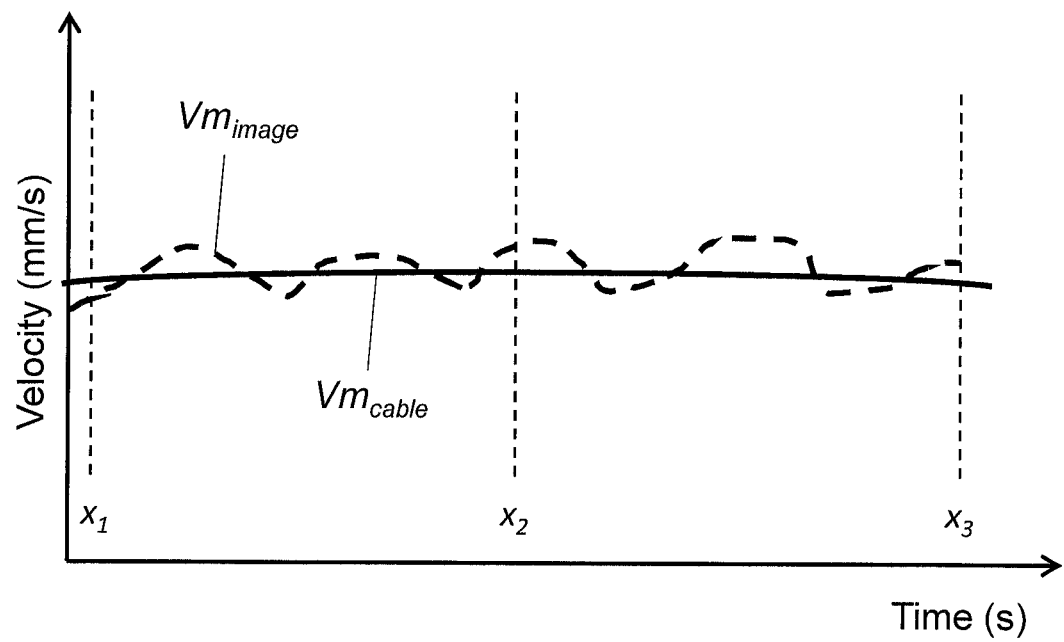
FIG. 3 is a chart showing, as a function of time, an observed axial velocity of an inspection tool in millimetres per second and an uphole-measured axial velocity of the tool in millimetres per second.

If $Vm_{cable}(t)$ and $Vm_{image}(t)$ were both accurate measurements of the tool velocity, the respective distances estimated in step 106 would be equal. However, this is typically not the case. In particular, $Vm_{cable}(t)$ cannot account for variations in velocity of the tool 10 with respect to the uphole end of the cable 16. Such variations might for example come about through stretching or oscillation of the cable 16, and/or through friction between the tool 10 and the wall of the pipe 14 that acts to cause stick-slip behaviour of the tool 10. $Vm_{image}(t)$, on the other hand, can accurately capture such high-frequency variations in the velocity of the tool 10, but typically provides a poorer estimate of average velocity of the tool over a relatively long distance compared to $Vm_{cable}(t)$ due to cumulative errors in the conversion of $VP_{image}(t)$ to $Vm_{image}(t)$, for example. FIG. 3 is an illustrative chart showing the variation of $Vm_{cable}(t)$ and $Vm_{image}(t)$ with transit time over three reference points $x_1, x_2, x_3$. As can be seen, $Vm_{cable}(t)$ usually varies only slowly over the time illustrated, while $Vm_{image}(t)$ exhibits higher-frequency variations.

Referring back to FIG. 2, in a seventh step 107, a corrected axial velocity $Vm_{corr}(t)$ as a function of time of the tool 10 is determined. $Vm_{corr}(t)$ is also in units of distance per unit time (millimetres per second in this example), and is given by:

$$Vm_{corr}(t) = a_x \cdot Vm_{image}(t)$$

where $a_x$ is a dimensionless correction factor that is calculated for each zone between adjacent reference points x so that the condition:

$$\int Vm_{corr}(t)dt = \int Vm_{cable}(t)dt$$

is satisfied for each zone.

Accordingly, $Vm_{corr}(t)$ is based on the velocity derived from the image data with a correction factor that ensures that, within each zone between adjacent reference points, $Vm_{corr}(t)$ provides an estimate of the total displacement distance traversed by the tool as it passes through the zone that is equal to the displacement distance which can be derived from $Vm_{cable}(t)$. In this way, $Vm_{corr}(t)$ provides a more accurate estimate of the velocity of the tool 10 than either $Vm_{image}(t)$ or $Vm_{cable}(t)$ alone.

Once $Vm_{corr}(t)$ has been calculated, an accurate estimate for the displacement distance of the tool 10 along the pipe between two time intervals can be obtained by integrating $Vm_{corr}(t)$ with respect to time between those time intervals. It will be appreciated that $Vm_{corr}(t)$, and therefore the position estimates that can be derived by integrating $Vm_{corr}(t)$, relate specifically to the position of the camera 12 of the tool 10.

Accordingly, in an optional eighth step 108, an accurate estimate of the downhole position of the camera 12 at a given transit time, relative to a given reference position, can be determined by integrating $Vm_{corr}(t)$ with respect to time between the transit time at the reference position and the transit time of interest.

Where the tool 10 includes further sensors disposed above or below the position of the camera 12 or is coupled to other tools with further sensors in a toolstring, an accurate estimate of the depth of those sensors can be obtained, in an optional ninth step 109, by applying a suitable offset to the calculated depth of the camera. The offset to be applied can be readily determined from knowledge of the geometry of the tool 10 (or the toolstring).

In this way, the images and data from other sensors obtained from the tool 10 can be ascribed accurately to a depth or position within the pipe 14 for further analysis.

Examples of how the steps of the method illustrated in FIG. 2 can be implemented in various embodiments of the invention will now be described.

Figure 4:
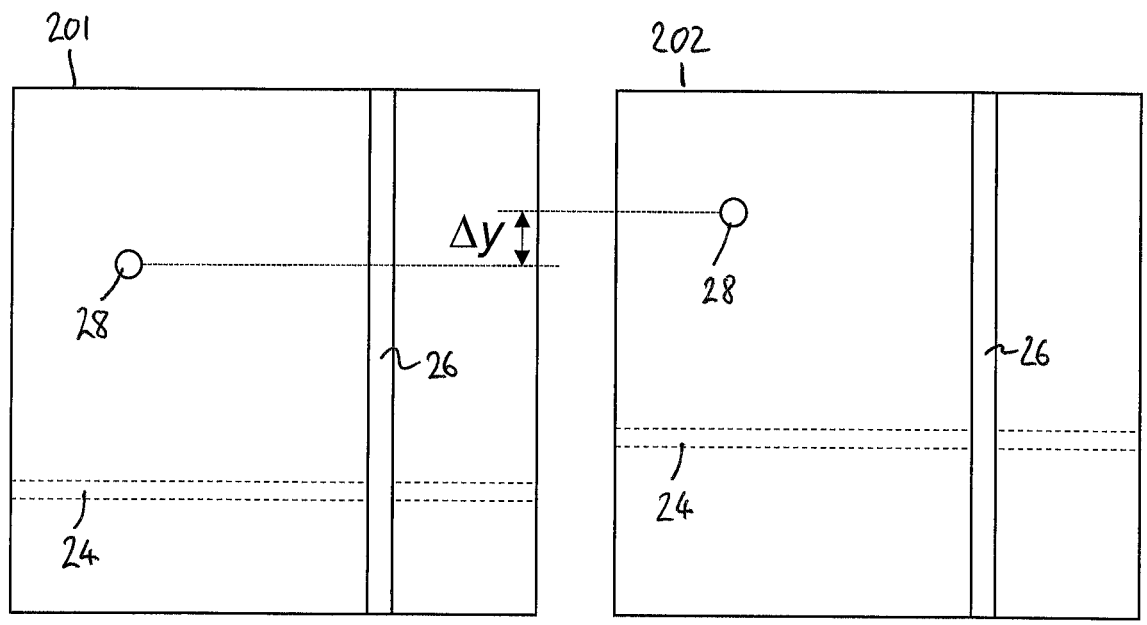
FIG. 4 illustrates two successive overlapping images captured by the camera of the tool of FIG. 1.

FIG. 4 is a schematic illustration of two images 201, 202 that form part of a set of images obtained in step 101, in an example where the tool (and therefore the camera) is moving downwardly in a pipe 14. In this case, the tool includes a plurality of reference markers in the form of reference blades 26, one of which is visible in both images 201, 202. The reference blades 26 comprise metal bands or similar structures of known width that extend from the tool body to contact the wall of the pipe 14. The reference blades 26 are arranged so that a region of at least one reference blade 26 that is in contact with the pipe wall is within the field of view of the camera, and so that the known width dimension of the blade is perpendicular to the optical axis of the camera. In some arrangements, the reference blades 26 are arranged to centralise the tool 10 in the pipe 14.

The second image 202 is obtained subsequent to the first image 201, so that the second image 202 captures a field of view that is shifted downwards in the pipe 14 with respect to the first image 201. The axial extent of the two images 201, 202 overlaps. In this example, a reference feature 24, such as a collar, is visible in both images. Another surface feature 28 is also visible in both images 201, 202.

Figure 5:
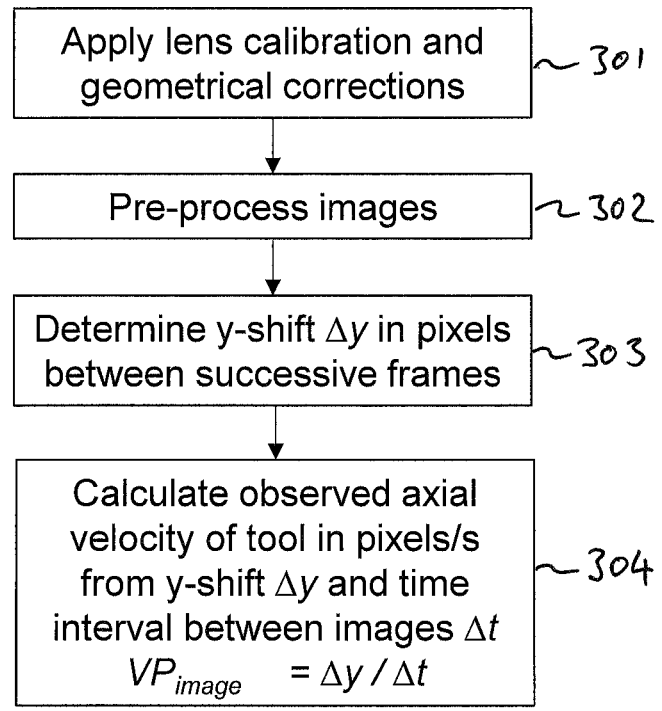
FIG. 5 is a flowchart showing steps in a method of determining an observed axial velocity of the tool of FIG. 1.

FIG. 5 describes one example of a method for determining the observed axial velocity of the tool in pixels per second, $VP_{image}(t)$, from the images 201, 202 (as required in step 102 of FIG. 2).

First, in step 301, the captured images 201, 202 can be adjusted to correct for different lighting conditions, geometrical distortions caused by viewing geometry and other distortions and effects, and to apply a lens calibration to account for individual lens properties.

Then, in step 302, the corrected images 201, 202 are pre-processed for subsequent image analysis, as is generally known in the art. Such pre-processing may include contrast enhancement, noise reduction, colour correction, and so on.

In step 303, the pre-processed images 201, 202 are analysed by suitable image analysis techniques to determine the shift in the axial (y) direction between the two images 201, 202, $\Delta y$ (see FIG. 4). This may be achieved by finding the overlap position between successive images 201, 202 with the maximum cross-correlation of image intensity. Alternatively, other image analysis techniques may be used to automatically detect one or more features common to the two successive images 201, 202, such as the surface feature 28 in FIG. 4, to determine the extent of overlap.

In step 304, the observed axial velocity of the tool in pixels per second, $VP_{image}$, is calculated for the pair of images 201, 202 by dividing the y-shift $\Delta y$ by the time interval $\Delta t$ between the images 201, 202. Repeating this calculation for successive pairs of overlapping images provides the observed axial velocity $VP_{image}(t)$ as a function of transit time, where the transit time assigned to each value of $VP_{image}$ is preferably taken as the mid-point between the capture times of each image 201, 202.

If the images are captured as part of a video stream with frame rate F (in units of frames per second), the observed axial velocity $VP_{image}$ (in units of pixels per second) can be calculated as $VP_{image} = \Delta y \cdot F$.

To convert $VP_{image}(t)$ to $Vm_{image}(t)$ (step 103 of FIG. 2), the distance on the surface of the pipe 14 that is represented by each pixel in an image 201, 202 after correction must be determined or estimated. This relationship depends primarily on the local internal diameter of the pipe 14. The refractive index of the fluid in the pipe 14, properties of the lens of the camera 12, and environmental effects on the lens can also affect the conversion factor between pixels and distance, but these factors are slowly varying and/or can be corrected in the calibration/correction step 302 and are therefore ignored in this example.

Figure 6:
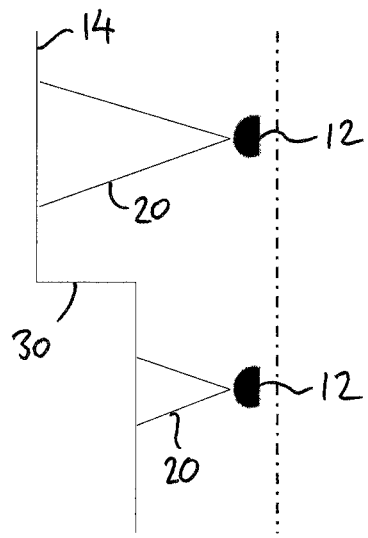
FIG. 6 illustrates a sideward facing camera of an inspection tool capturing images of the internal surface of a pipe having a varying internal diameter.

FIG. 6 is a schematic diagram illustrating the imaging geometry as the camera 12 of the tool passes along a pipe 14 having a shoulder 30 at which the internal diameter of the pipe 14 changes. Above the shoulder 30, the internal diameter is relatively large, and below the shoulder 30 the internal diameter is relatively small. The field of view 20 when the camera 12 is above the shoulder 30 captures a larger physical area of the internal wall of the pipe 14 than when the camera 12 is below the shoulder 30. The camera 12 produces images of equal pixel dimensions in both cases. Accordingly, when the camera 12 is above the shoulder 30, each pixel in the resulting image corresponds to a larger distance compared to when the camera 12 is below the shoulder 30.

Figure 7:
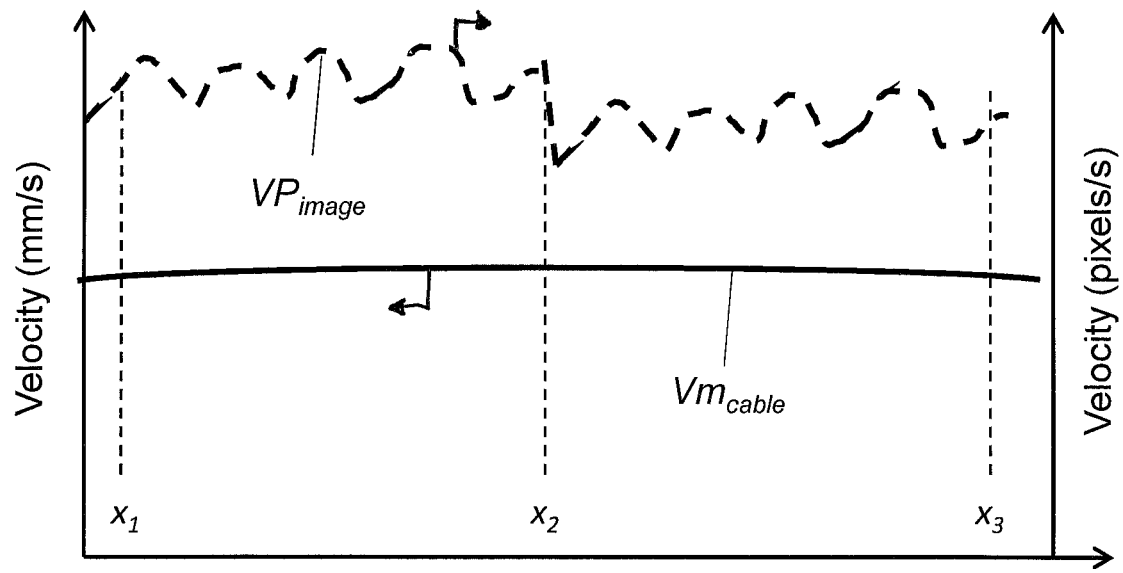
FIG. 7 is a chart showing, as a function of time, an observed axial velocity of an inspection tool in pixels per second and an uphole-measured axial velocity of the tool in millimetres per second.

FIG. 7 shows the variation of $VP_{image}(t)$ as a function of time in a situation like that illustrated in FIG. 6. As the camera passes the position of the shoulder 30, corresponding to reference point $x_2$ in FIG. 7, the average value of $VP_{image}(t)$ drops, even though the velocity of the tool (when expressed as distance per unit time) is approximately constant, as indicated by $Vm_{cable}(t)$.

Figure 8:
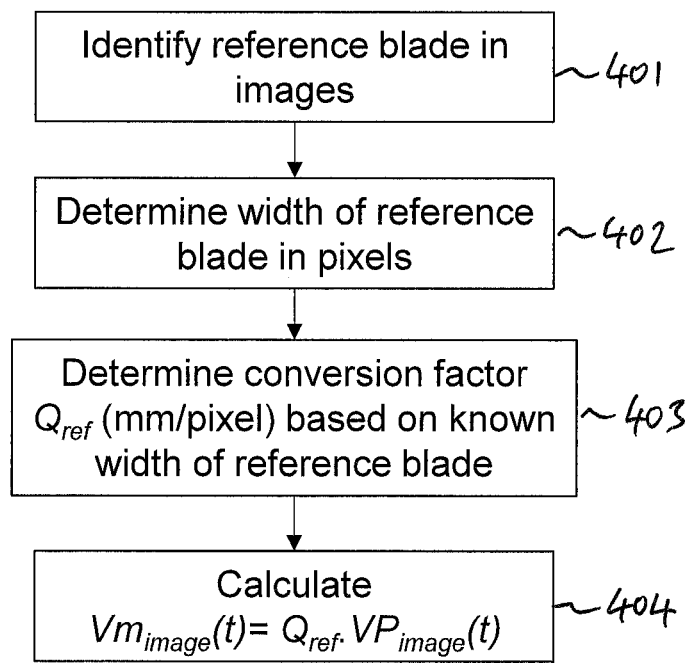
FIG. 8 is a flowchart showing steps in a method of converting the observed axial velocity of an inspection tool from pixels per second to millimetres per second.

FIG. 8 describes a method of converting $VP_{image}(t)$ to $Vm_{image}(t)$ (step 103 of FIG. 2) using the reference blades 26 described above (see FIG. 3) to establish the distance represented by each pixel in each image 201, 202.

First, in step 401, image analysis is used to identify the pixels in the corrected images 201, 202 that are occupied by the reference blade 26. Then, in step 402, the width of the reference blade 26 in pixels is measured from the images. Then, in step 403, a conversion factor $Q_{ref}$ in millimetres per pixel is determined, based on the known width of the reference blade 26. Finally, in step 404, $Vm_{image}(t)$ can be calculated as:

$$Vm_{image}(t) = Q_{ref} \cdot VP_{image}(t).$$

Once $Vm_{image}(t)$ has been calculated in this way, the corrected axial velocity of the tool $Vm_{corr}(t)$ can be determined, along with the corrected position of the camera and further sensors as described above with reference to steps 105 to 109 of FIG. 2.

The conversion factor $Q_{ref}$ will vary as a function of transit time if the diameter of the pipe is not constant. Preferably, therefore, the method of FIG. 8 is performed for each value of $VP_{image}(t)$. However, if the diameter of the pipe is known to be constant or slowly varying, it may be sufficient to establish a single value of the conversion factor $Q_{ref}$ for the whole inspection run or for each of the zones.

A variant of the method of FIG. 2 can be used if the spacing between reference features 24 is known. In this case, an estimated axial velocity of the tool $Vm_{ref}$ for each zone can be determined by dividing the known spacing between the reference features 24 by the time taken for the tool to transit the corresponding zone, as determined from the images in step 104 of FIG. 2. This estimated axial velocity $Vm_{ref}$ can be used in place of $Vm_{cable}(t)$ in steps 106 and 107 of FIG. 2 to compute the corrected axial velocity of the tool. Equivalently, the known spacing between the reference features can be used directly in place of $Vm_{cable}(t)$ dt in step 107 of FIG. 2. It will be appreciated that, in this variant, displacement measurements of the cable are not required, and so this variant of the method can be used with tools that are not connected to a surface module by a cable or other connecting line.

Figure 9:
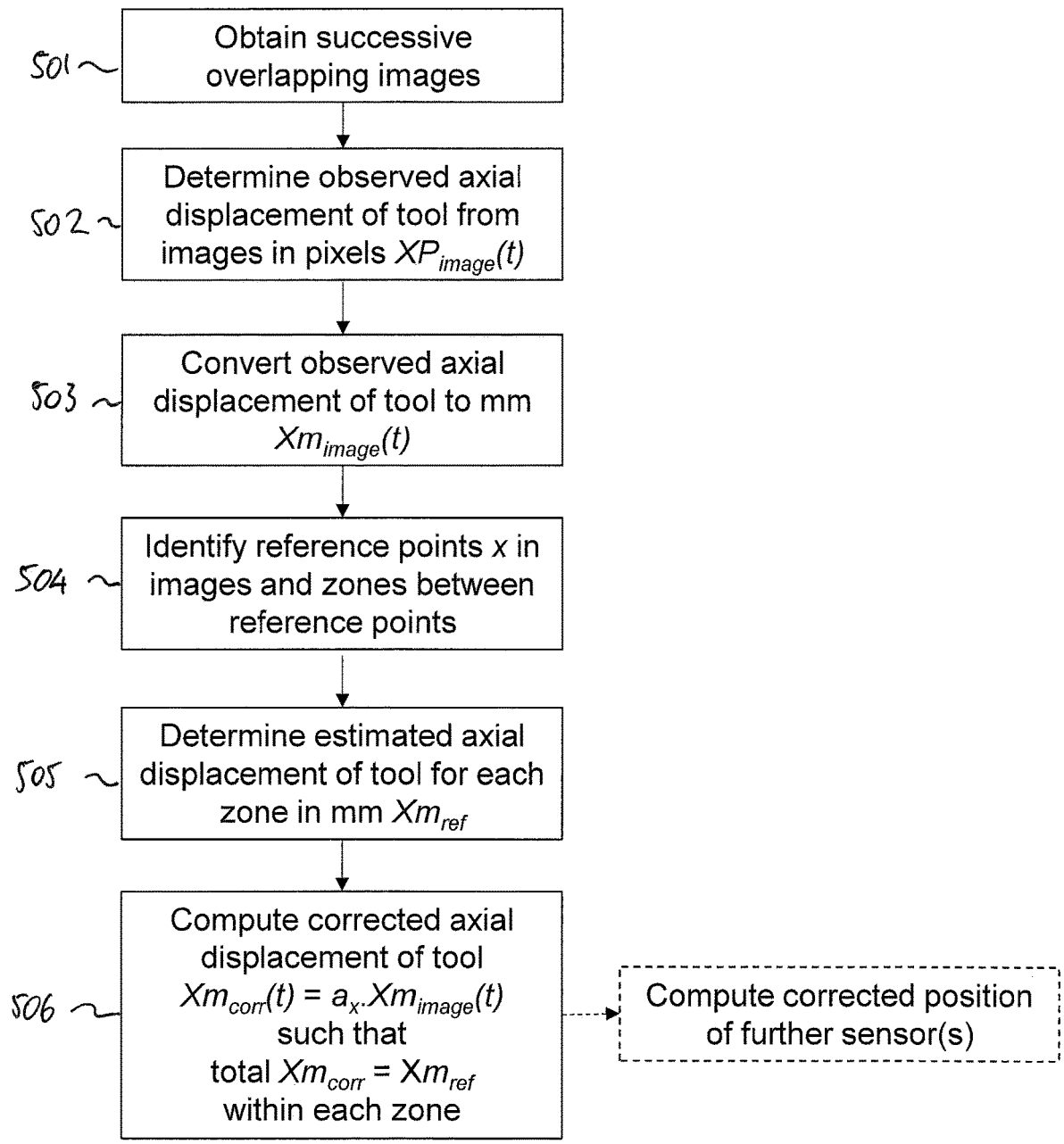
FIG. 9 is a flowchart showing a variant of the method of FIG. 2.

FIG. 9 describes another alternative method of calculating a corrected position of the tool 10. In the method of FIG. 9, observations and estimates of displacement distance are used in an analogous way to the observations and estimates of velocity in the method of FIG. 2.

In step 501 of the method of FIG. 9, a plurality of successive axially-overlapping images are obtained as described above with reference to step 101 of FIG. 2. The transit time at which each image was obtained is also recorded, with the transit time being set to zero when the first image is recorded.

In step 502, the observed axial displacement distance of the tool in pixels as a function of transit time, $XP_{image}(t)$, is determined from the overlapping images. Referring back to FIGS. 4 and 5, the observed axial displacement distance $XP_{image}(t)$ is equal to the y-shift $\Delta y$ between successive images.

In step 503, a conversion factor is applied to the observed axial displacement distance in pixels to obtain an observed axial displacement distance $Xm_{image}(t)$ in units of distance (millimetres in this example). $Xm_{image}(t)$ can be calculated as:

$$Xm_{image}(t) = Q_{ref} \cdot XP_{image}(t)$$

where the conversion factor $Q_{ref}$ can calculated in the same way as described above with reference to steps 401 to 403 of FIG. 8.

In step 504, reference points x and corresponding zones are identified in the images, as described above with reference to step 104 of FIG. 2.

In step 505, an estimated axial displacement distance of the tool $Xm_{ref}$, in units of distance (millimetres this example), is determined for each zone. $Xm_{ref}$ is an estimate of the total distance moved by the tool as it passes from the start to the end of each zone. $Xm_{ref}$ may for example be obtained from direct measurement of the displacement of the cable, or by integrating the measured velocity of the cable $Vm_{cable}(t)$ with respect to time within each zone. Alternatively, if the spacing between reference features 24 is known, this spacing can be taken as the estimated axial displacement distance $Xm_{ref}$ of the tool as it passes through the corresponding zone.

In step 506, the corrected axial displacement distance of the tool as a function of time, $Xm_{corr}(t)$, is determined. $Xm_{corr}(t)$ is also in units of distance and is given by:

$$Xm_{corr}(t)=a_x \cdot Xm_{image}(t)$$

The correction factor $a_x$ is calculated for each zone between adjacent reference points x so that, within each zone, the total axial displacement distance traversed by the tool within that zone, computed from $Xm_{corr}(t)$, equals the estimated axial displacement distance $Xm_{ref}$ for that zone.

In optional step 507, an accurate estimate of the position of further sensors on the tool or toolstring can be obtained by applying a suitable offset to the corrected axial displacement distance of the tool determined in step 506.

It will be appreciated that, in the case where a known spacing between reference features is used as the estimated axial displacement distance of the tool $Xm_{ref}$ in step 505 of FIG. 9, it is not necessary to obtain a displacement measurement of the cable.

The method of FIG. 9 can therefore also be applied to an inspection tool that is not connected to a surface module by a cable or other connecting line.

The methods described above, in which reference blades 26 are used to determine the conversion factor $Q_{ref}$, can be used when the tool 10 includes a single sideways-facing camera 12, or when the tool 10 includes multiple sideways-facing cameras.

Where multiple sideways-facing cameras are provided, they are preferably arranged to capture the whole circumference of the pipe 14 in a plurality of successive sets of circumferentially-overlapping images. The cameras are preferably disposed in a single plane that extends perpendicular to a longitudinal axis of the tool. Accordingly, each of the cameras is disposed at the same distance from an end of the tool.

The multiple (e.g. 4) cameras are mounted symmetrically or equidistantly around the inspection tool and are arranged such that, within a certain range of pipe sizes, there is an overlap in the fields of view of neighbouring cameras. There is, therefore, a corresponding overlap in the captured images from neighbouring cameras.

When image data from multiple cameras is available, one approach is to calculate the observed axial displacement distance or velocity of the tool using the axially-overlapping images from each camera separately, as described with reference to FIGS. 4 and 5, and then average these results. These averaged values can be taken as the observed axial velocity of the tool $VP_{image}(t)$ as a function of time in step 102 of FIG. 2 or the observed axial displacement distance of the tool $XP_{image}(t)$ as a function of time in step 502 of FIG. 9. Taking an average value for the observed velocity or displacement distance of the tool removes or substantially reduces the effect of the tool being non-centred in the pipe 14.

An alternative approach is to perform a circumferential stitching of the synchronised circumferentially-overlapping images from the set of cameras to provide, at each image time interval, a composite image covering the whole circumference of the pipe. The observed axial velocity of the tool $VP_{image}$ as a function of time or the observed axial displacement distance of the tool $XP_{image}(t)$ as a function of time can then be obtained by analysis of successive composite images in the manner described above with reference to FIGS. 4 and 5. In this case, any eccentricity of the tool within the pipe 14 can be corrected for during circumferential stitching.

When the inspection tool 10 does not include reference blades 26, a conversion factor from pixels to distance units cannot be obtained by the method of FIG. 8. Instead, if the diameter of the pipe 14 is reliably known, the conversion factor required to convert the observed axial velocity from pixels per second to millimetres per second in step 103 of FIG. 2 or the observed axial displacement distance from pixels to millimetres in step 503 of FIG. 9 can be determined from the internal diameter and the imaging geometry.

Figure 10:
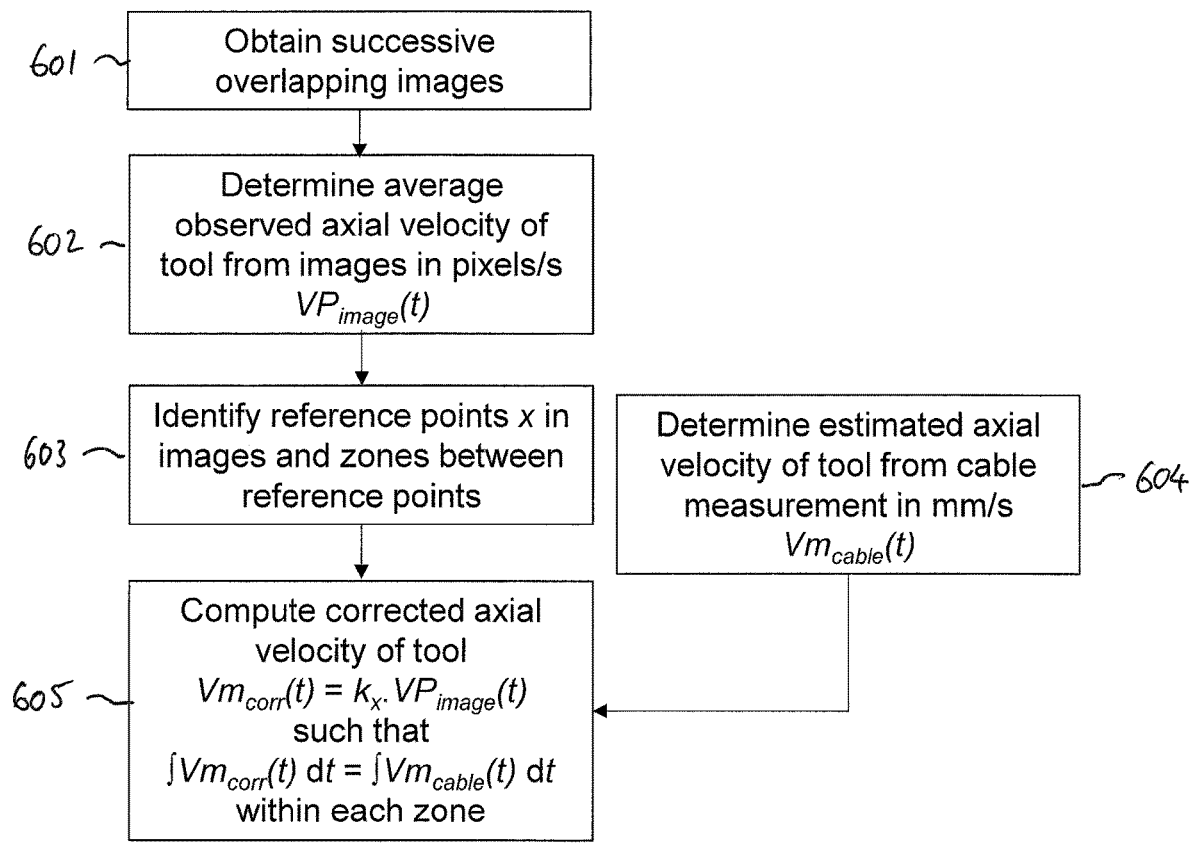
FIG. 10 is a flowchart showing another variant of the method of FIG. 2.

FIG. 10 illustrates a variation of the method of FIG. 2 for determining a corrected axial velocity $Vm_{corr}(t)$ of the tool 10. In this variant, in step 601, successive overlapping images are obtained using a multi-camera side view tool as described above. Then, in step 602, the average observed axial velocity of tool in pixels per second, $VP_{image}(t)$, is determined, again as described above.

Steps 603 (identification of reference points and zones in the images) and 504 (determination of the estimated axial velocity of the tool, $Vm_{cable}(t)$, in units of distance per unit time) of the method of FIG. 10 are equivalent to steps 104 and 105 respectively of the method of FIG. 2.

In the method of FIG. 10, however, $VP_{image}(t)$ is not converted directly to units of distance per unit time. Instead, in step 605, the integral of $Vm_{cable}(t)$ is used both to account for the conversion factor from pixels to millimetres and to correct errors in the estimated velocity determined from the images. Thus, in step 605, the corrected axial velocity of the tool $Vm_{corr}(t)$ is calculated as:

$$Vm_{corr}(t)=k_x \cdot VP_{image}(t)$$

where $k_x$ is a correction factor (with units of distance per image pixel) that is calculated for each zone between adjacent reference points x so that the condition:

$$\int Vm_{corr}(t)dt = \int Vm_{cable}(t)dt$$

is satisfied within each zone. Again, this condition requires that, for each zone, the total displacement distance of the tool derived from the corrected axial velocity equals the estimated displacement distance of the tool over the same zone when calculated from the tool velocity determined from the cable measurements.

The corrected depth of the camera and of other sensors can be calculated from $Vm_{corr}(t)$ as previously described.

In this way, $Vm_{corr}(t)$ and corrected depth data for the tool can be determined without knowledge of the internal diameter of the pipe 14 and without a reference measurement of the distance per pixel in the images. In doing so, it is assumed that the internal diameter of the pipe 14 is constant between each adjacent pair of reference points.

Figure 11:
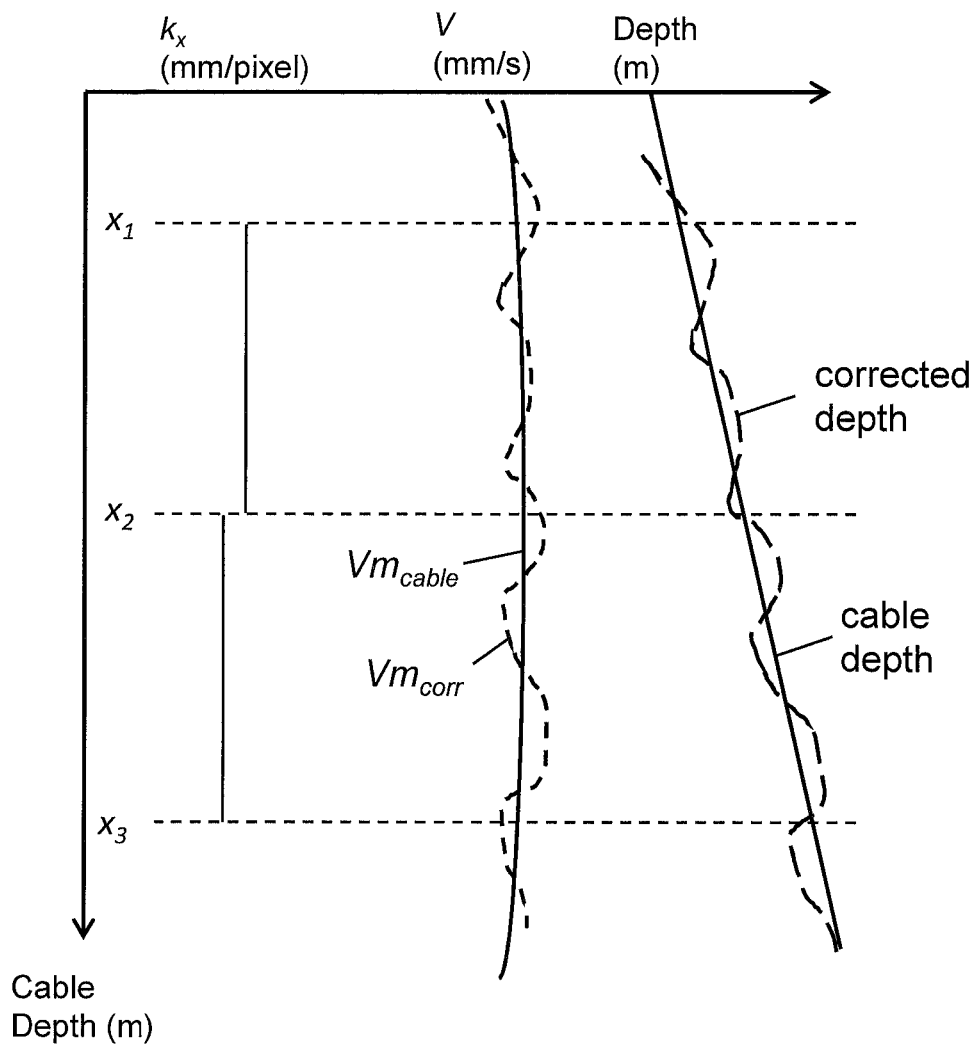
FIG. 11 is a chart showing, as a function of measured depth, an uphole-measured axial velocity of the tool in millimetres per second, a corrected axial velocity of the tool in millimetres per second and an associated correction factor, and a corrected depth measurement of the tool.

FIG. 11 shows the variation of $k_x$, $Vm_{cable}$, $Vm_{corr}$ and the corrected depth calculated from $Vm_{corr}$ with respect to the uphole-measured depth of the tool (i.e. the length of cable payed out). In this example, at reference point $x_2$, the step change in $k_x$ corresponds to a change in the internal diameter of the pipe 14.

In some cases, a measurement of the internal diameter of the pipe 14 can obtained during data acquisition by including suitable apparatus on the tool 10 (or on a toolstring coupled to the tool). Examples of apparatus that can be used to measure the internal diameter include multi-finger caliper devices, laser rangefinders, sonic rangefinders, infra-red rangefinders and so on.

When an independent internal diameter measurement is available, this can be taken into account by adjusting the value of $k_x$ in step 605 of the method of FIG. 10. The distance between the camera and the internal surface of the pipe 14 as a function of elapsed time, $D(t)$, can be calculated from the internal diameter measurement data and knowledge of the inspection tool geometry. The average value of the correction factor $k_{xAv}$ within each zone is calculated so that the condition:

$$k_{xAv} \cdot \int VP_{image} dt = \int Vm_{cable} dt$$

is satisfied within each zone. Then, the value of the correction factor as a function of time within each zone, $k_x(t)$, can be calculated as:

$$k_x(t) = (k_{xAv}/D_{xAv}) \cdot D(t)$$

where $D_{xAv}$ is the average distance between the camera and the wall in that zone.

Figure 12:
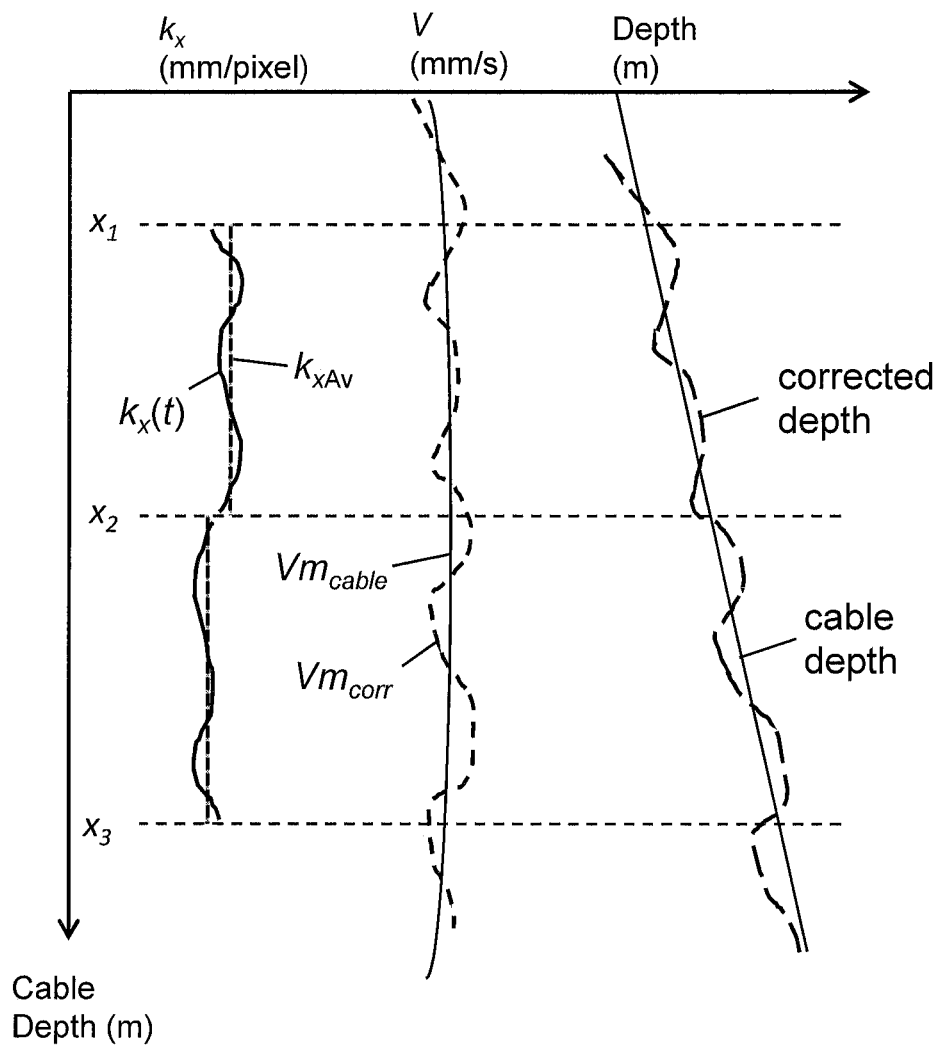
FIG. 12 is a chart showing, as a function of measured depth, an uphole-measured axial velocity of the tool in millimetres per second, a corrected axial velocity of the tool in millimetres per second and an adjusted correction factor, and a corrected depth measurement of the tool.

FIG. 12 shows the variation of $k_x$, $Vm_{cable}$, $Vm_{corr}$ and the corrected depth calculated from $Vm_{corr}$ with respect to the uphole-measured depth of the tool for a case where the internal diameter data is taken into account when determining $k_x$.

Figure 13:
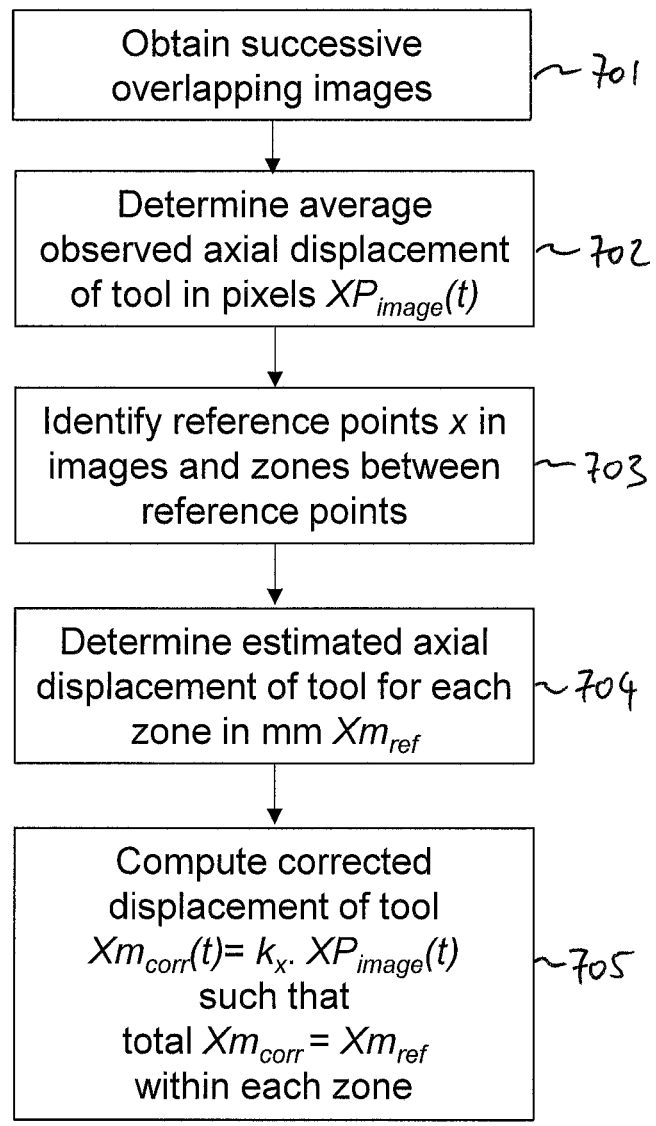
FIG. 13 is a flowchart showing a further variant of the method of FIG. 2.

If the spacing between reference features is known, the method of FIG. 10 can be adapted to use an estimated axial velocity $Vm_{ref}$ for each zone, calculated by dividing the known spacing between the reference features 24 by the time taken for the tool to transit the corresponding zone, in place of $Vm_{cable}(t)$ in step 105 of FIG. 10. FIG. 13 describes a variation of the method of FIG. 10, in which observations and estimates of displacement distance are used instead of observations and estimates of velocity.

In step 701 of the method of FIG. 13, successive overlapping images are obtained using a multi-camera side view tool as described above. Then, in step 702, the average observed axial displacement distance of the tool in pixels, $XP_{image}(t)$, is determined as a function of time, again as described above.

Steps 703 (identification of reference points and zones in the images) and 704 (determination of the estimated axial displacement distance of the tool, $Xm_{ref}$ in units of distance) of the method of FIG. 13 are equivalent to steps 504 and 505 respectively of the method of FIG. 9.

In step 705, the corrected axial displacement distance of the tool $Xm_{corr}(t)$ is calculated as:

$$Xm_{corr}(t) = k_x \cdot XP_{image}(t)$$

where the correction factor $k_x$ is calculated for each zone between adjacent reference points x so that the total axial displacement distance over that zone, calculated from $Xm_{corr}(t)$, is equal to the estimated axial displacement distance $Xm_{ref}$ determined in step 704.

Figures 14A, 14B, 14C:
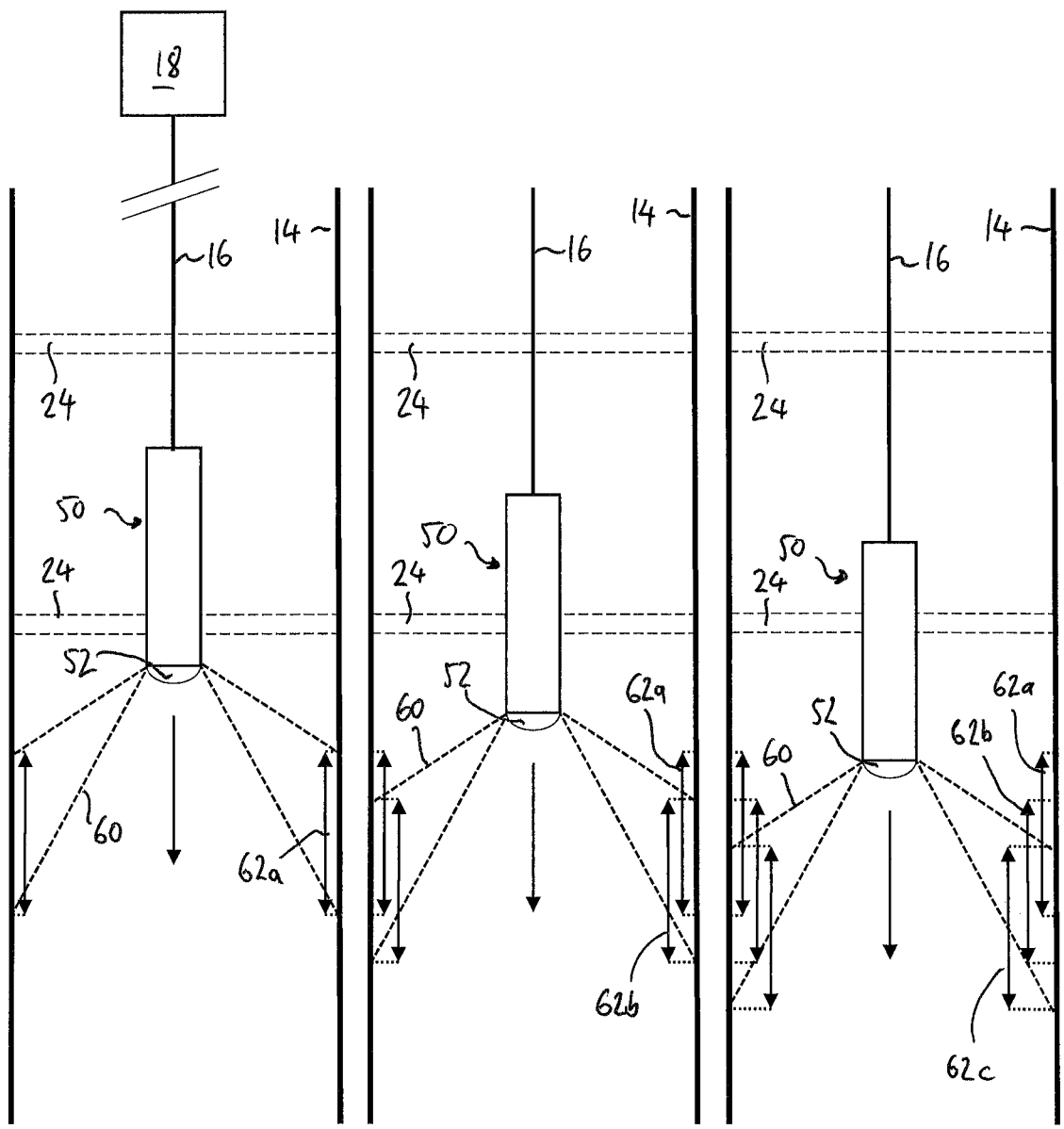
FIGS. 14a, 14b and 14c illustrate an inspection tool having a downview camera capturing successive overlapping images of the internal surface of a pipe as the inspection tool is moved along the pipe.

FIGS. 14a, 14b and 14c illustrate the acquisition of images using a tool 50 having a downward-facing camera 52, such that the camera 52 captures images through a lens disposed at a distal end of the tool 50. This arrangement may be generally referred to as a downview camera in the art of wellbore inspection tools.

Successive overlapping images of the internal surface of the pipe 14 captured with a downview camera tool 50 can also be used to calculate $Vm_{corr}(t)$ or $Xm_{corr}(t)$, for example by following the methods described above with reference to FIG. 10 or FIG. 13.

It will be appreciated, however, that the images acquired by a downview camera include highly distorted regions, and so care must be taken to correct for such distortions.

For example, the determination of the observed axial velocity may be performed on images that are cropped to an effective field of view within which the geometric distortion is relatively small (i.e. not too close to the camera 52) and within which each pixel corresponds to a reasonably small distance on the pipe wall (i.e. not too far from the camera 52). FIGS. 12a, 12b and 12c, show a suitable field of view 60 and the resulting axial extent 62a, 62b, 62c of the regions of three successive captured images from which the observed axial velocity or displacement distance can be derived.

Also, the geometrical correction applied to the images (for example in step 301 of FIG. 5) may be determined by automatically detecting one or more features common to all of the images in the set or plurality of successive images. This common feature or fixed feature may, for example, be the vanishing point. The fixed features are detected by means of suitable image recognition techniques, such as by detecting the characteristic shape and contrast of the far pipe (the vanishing point). One or more moving features are also detected in the set of successive images. These are features that are stationary in the pipe such that the position of these features in successive images captured by the camera moves according to the location of the camera in the pipe. Parts or regions of each of the images having high contrast are automatically detected and their positions are recorded. The change in the spatial positions of the detected moving objects between successive images in the set of images can be detected, and a trajectory for each of the detected moving objects calculated. In a subsequent step, the position of one or more fixed features and the trajectory of one or more moving features are used to determine the position of the camera lens in the pipe and the orientation or angular tilt of the tool axis relative to the pipe axis. This camera position information, including distance of the camera lens from a central axis of the pipe and angular tilt of the tool relative to the axis of the pipe, is then used to calculate a geometrical correction that is applied to the images before subsequent determination of $VP_{image}(t)$ or $XP_{image}(t)$.

After suitable geometrical correction, the images obtained from a downview camera tool 50, as illustrated in FIGS. 14a, 14b and 14c, can be treated substantially identically to those from a sideview camera tool 10 in the subsequent processing and analysis steps.

The tool may connected to the control module by any suitable connecting line. The above examples refer to arrangements in which the connecting line comprises a cable. Such a cable could be of any suitable type, and may for example be a slickline or electric line. The connecting line may instead be in the form of tubing, such as coiled tubing or drill pipe. The connecting line may allow communication between the tool and the control module, through electrical, fibre optic or other communication routes, or instead the connecting line may simply support the tool (in which case the data acquired by the tool may be stored by a logging device of the tool and downloaded after retrieval of the tool).

It is also possible that the inspection tool could be of a type in which no connecting line is present. For example, the inspection tool could be a self-propelled robotic tool.

It will be appreciated that, while in the above-referenced examples the imaging device is a visible light camera, other suitable imaging devices may be used in the methods and systems of the invention. Substantially any imaging device that can provide time-indexed, a really-extending data from the internal surface of the conduit could be used. For example, suitable alternative imaging devices include non-visible light cameras, such as infra-red cameras, and acoustic sensors.

The devices and/or components described herein can perform one or more processes and/or methods described herein. For example, the devices and/or components can perform at least a portion of such processes and/or methods based on a processor executing software instructions stored by a computer-readable medium, such as memory and/or storage component. A computer-readable medium (e.g., a non-transitory computer-readable medium) is defined herein as a non-transitory memory device. A memory device includes memory space located inside of a single physical storage device or memory space spread across multiple physical storage devices. When executed, software instructions stored in a computer-readable medium may cause a processor to perform one or more processes and/or methods described herein. Additionally, or alternatively, hardwired circuitry may be used in place of or in combination with software instructions to perform one or more processes and/or methods described herein. Thus, embodiments described herein are not limited to any specific combination of hardware circuitry and software.

Further modifications and variations of the invention not explicitly described above may also be made without departing from the scope of the invention as defined in the appended claims.

The invention claimed is:

1. A method for determining a corrected axial displacement parameter of a conduit inspection tool having an imaging device comprising at least one video camera, the method comprising:
obtaining, using the video camera, successive axially overlapping images of an internal wall of a conduit during transit of the tool axially along the conduit;
determining, from the images, an observed axial displacement parameter of the tool as a function of transit time;
identifying, in the images, a plurality of reference features of fixed position in the conduit and corresponding reference points comprising transit times at which said reference features appear;
determining an estimated axial displacement distance of the tool over an interval of transit time between successive reference points; and
computing the corrected axial displacement parameter of the tool by applying a correction factor to the observed axial displacement parameter;
wherein the correction factor is determined such that, within the interval of transit time between successive reference points, a total axial displacement distance of the tool determined from the corrected axial displacement parameter is equal to the estimated axial displacement distance.

2. The method according to claim 1, wherein the estimated axial displacement distance of the tool equals a known spacing distance between the corresponding reference features.

3. The method according to claim 1, wherein the correction factor is constant within each interval of transit time between successive reference points.

4. The method according to claim 1, comprising:
measuring the internal diameter of the conduit as a function of transit time;
wherein the correction factor varies within each interval of transit time as a function of the measured internal diameter.

5. The method according to claim 1, wherein the imaging device comprises one or more sideview cameras arranged such that a centreline of the field of view of the or each camera is substantially perpendicular to a longitudinal axis of the inspection tool.

6. The method according to claim 1, wherein the imaging device comprises a downview camera arranged such that a centreline of the field of view of the camera is substantially parallel to a longitudinal axis of the inspection tool.

7. The method according to claim 1, wherein the tool is attached to a control module with a connecting line, and wherein determining the estimated axial displacement distance of the tool comprises making a displacement measurement of the connecting line at the control module.

8. The method according to claim 7, wherein determining the estimated axial displacement distance of the tool comprises determining, from the displacement measurement of the connecting line, an estimated axial velocity of the tool as a function of transit time and integrating the estimated axial velocity with respect to time over the interval of transit time.

9. The method according to claim 1, wherein the axial displacement parameter is a displacement distance, and wherein the total axial displacement distance of the tool within the interval of transit time is determined as the difference in corrected axial displacement distance over the interval.

10. The method according to claim 9, wherein the tool comprises a further sensor offset axially with respect to the imaging device, and wherein the method further comprises:
determining a corrected axial displacement position of the further sensor by applying an axial offset to the corrected axial displacement distance of the tool.

11. The method according to claim 9, wherein the observed axial displacement distance of the tool is determined in units of image pixels, and wherein the method comprises:
converting the observed axial displacement distance to units of distance by applying a conversion factor to the observed axial displacement distance before computing the corrected axial displacement distance of the tool.

12. The method according to claim 11, comprising:
arranging a reference marker of known dimension against the internal wall of the conduit within a field of view of the camera, such that the reference marker is visible in one or more of the obtained images;
identifying the reference marker in an image corresponding to a transit time;
determining the number of image pixels occupied by the known dimension of the reference marker; and
determining the conversion factor for that transit time based on the determined number of image pixels and the known dimension of the reference marker.

13. The method according to claim 1, wherein the axial displacement parameter is a velocity, and wherein the total axial displacement distance of the tool within the interval of transit time is determined by integrating the corrected axial velocity with respect to time over the interval of transit time.

14. The method according to claim 13, further comprising integrating the corrected axial velocity with respect to time to determine a corrected axial displacement distance of the tool as a function of time.

15. The method according to claim 14, wherein the tool comprises a further sensor offset axially with respect to the imaging device, and wherein the method further comprises:
determining a corrected axial displacement position of the further sensor by applying an axial offset to the corrected axial displacement distance of the tool.

16. The method according to claim 13, wherein the observed axial velocity of the tool is determined in units of image pixels per unit time, and wherein the method comprises:
converting the observed axial velocity to units of distance per unit time by applying a conversion factor to the observed axial velocity before computing the corrected axial velocity of the tool.

17. The method according to claim 16, comprising:
arranging a reference marker of known dimension against the internal wall of the conduit within a field of view of the video camera, such that the reference marker is visible in one or more of the obtained images;
identifying the reference marker in an image corresponding to a transit time;
determining the number of image pixels occupied by the known dimension of the reference marker; and
determining the conversion factor for that transit time based on the determined number of image pixels and the known dimension of the reference marker.

18. The method according to claim 17, wherein the tool comprises the reference marker.

19. A conduit inspection system comprising:
a conduit inspection tool having an imaging device comprising at least one video camera and arranged to transit axially along a conduit; and
a computer system arranged to:
obtain, from the video camera, successive axially overlapping images of an internal wall of the conduit;
determine, from the images, an observed axial displacement parameter of the tool as a function of transit time;
identify, in the images, a plurality of reference features of fixed position in the conduit and corresponding reference points comprising transit times at which said reference features appear;
determine an estimated axial displacement distance of the tool over an interval of transit time between successive reference points; and
compute the corrected axial displacement parameter of the tool by applying a correction factor to the observed axial displacement parameter;
wherein the correction factor is determined such that, within the interval of transit time between successive reference points, a total axial displacement distance of the tool, determined from the corrected axial displacement parameter, is equal to the estimated axial displacement distance.

20. The conduit inspection system according to claim 19, comprising a control module and a connecting line attached to the imaging device, the control module being arranged to control movement of the connecting line to transit the tool axially along a conduit; and wherein the computer system is arranged to determine the estimated axial displacement parameter of the tool by making a displacement measurement of the connecting line at the control module.

21. The conduit inspection system according to claim 19, wherein the imaging device comprises one or more sideview cameras.

22. A conduit inspection system according to claim 19, wherein the imaging device comprises a downview camera.

23. The conduit inspection system according to claim 19, wherein the inspection tool comprises a reference marker of known dimension arranged to lie on the internal wall of the conduit within a field of view of the camera, such that the reference marker is visible in one or more of the obtained images, and wherein the computer system is arranged to:
identify the reference marker in an image corresponding to a transit time;
determine the number of image pixels occupied by the known dimension of the reference marker;
determine a conversion factor for that transit time based on the determined number of image pixels and the known dimension of the reference marker; and
apply the conversion factor to the observed axial displacement parameter.

24. A method for determining a corrected axial displacement parameter of a conduit inspection tool having an imaging device comprising at least one video camera, the method comprising:
obtaining, using the video camera, successive axially overlapping images of an internal wall of a conduit during transit of the tool axially along the conduit;
determining, from the images, an observed axial displacement parameter of the tool as a function of transit time;
identifying, in the images, a plurality of reference features of fixed position in the conduit;
identifying a corresponding plurality of reference transit times at which said reference features appear;
determining an estimated axial displacement distance of the tool over each of a plurality of transit time intervals between successive reference transit times; and
computing the corrected axial displacement parameter of the tool for each of the plurality of transit time intervals by applying a correction factor to the observed axial displacement parameter;
wherein the correction factors are computed by applying the condition that, within each transit time interval, a total axial displacement distance of the tool determined from the corrected axial displacement parameter is equal to the estimated axial displacement distance.

* * * * *